JOHN W. CARTER.

Improvement in the Manufacture of Writing Ink.

No. 124,544.  Patented March 12, 1872.

Witnesses.

Inventor.

124,544

UNITED STATES PATENT OFFICE.

JOHN W. CARTER, OF BOSTON, MASSACHUSETTS.

IMPROVEMENT IN THE MANUFACTURE OF WRITING-INK.

Specification forming part of Letters Patent No. 124,544, dated March 12, 1872.

Specification describing an Improvement in the Manufacture of Writing-Inks, invented by JOHN W. CARTER, of Boston, in the county of Suffolk and State of Massachusetts.

The object of this invention is to provide a process for preparing inks and writing-fluids by which the effects now produced by aging the inks may be obtained in a much shorter time than has heretofore been occupied for this purpose. In the manufacture of inks and writing-fluids, especially such as contain salts of iron, with the extract of galls or tannic and gallic acids, it has been customary to retain them for from four weeks to twelve months in the factory, in open tanks or other suitable vessels, for the purposes of developing their colors and separating extraneous matters by oxidization or aging; and it is generally considered necessary that writing-inks, especially black inks, should be thus aged before they are drawn into bottles or other tight packages ready for sale. I have discovered that the same or similar effects to those produced by aging inks and writing-fluids may be obtained by driving common air in fine small streams into and through considerable quantities of these fluids, and that this may be accomplished by means of the device hereinafter described, thus shortening the time of retaining inks in process of manufacture.

To enable others to make use of my invention I will describe one mode of operation by which I effect these results, reference being made to the accompanying drawing making part of this specification.

A represents a tight, strong wooden tank, open at the top, and provided with a suitable outlet for drawing off the ink; and I prefer to use a tank having a capacity of more than one thousand gallons.

Figure 1:
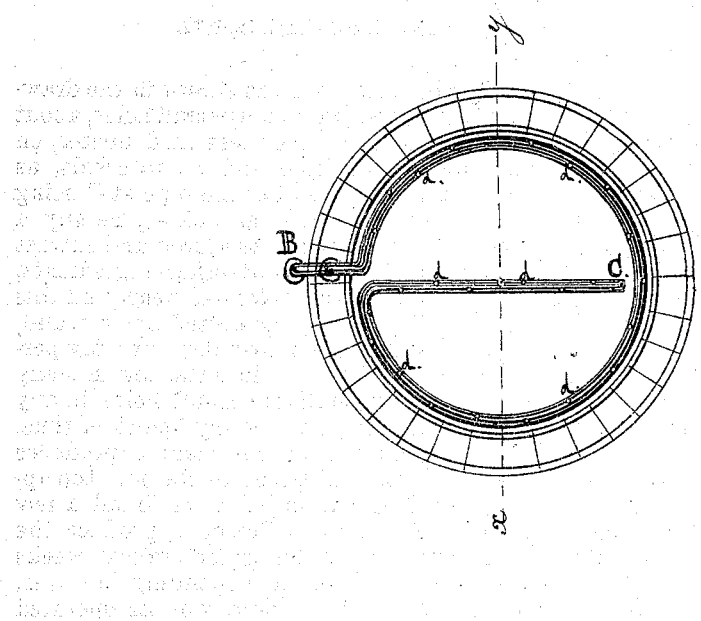
Figure 2:
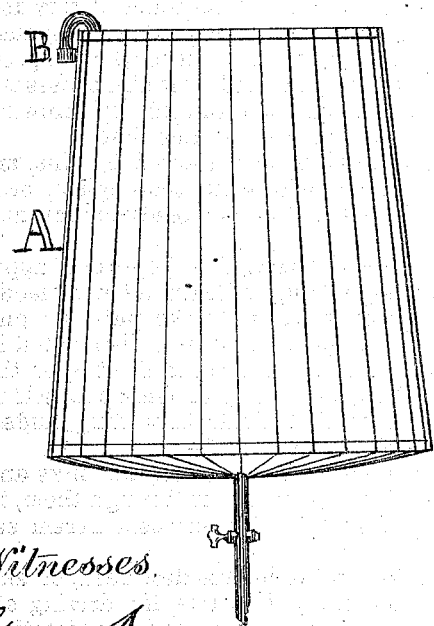
Figure 3:
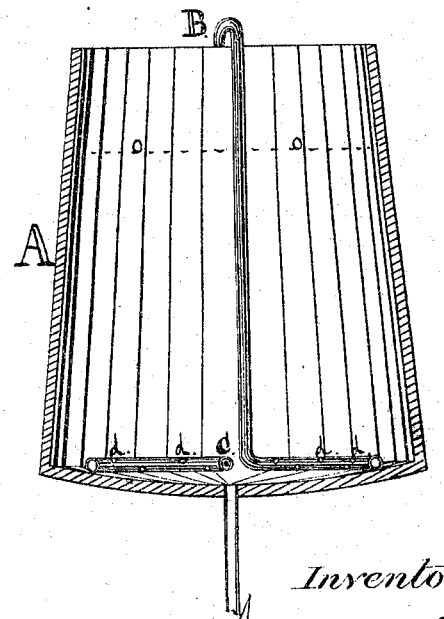

Figure 1 represents the bottom of such a tank.

B C is a movable pipe, preferably of copper, which passes over the edge of the tank and down the inside to the bottom, then once around, resting on the bottom near to and following the sides, and then across the circle formed in this way. This pipe is provided with a suitable arrangement at B for connecting it, either by rubber hose or other pipes, with an air-pump, not shown, which throws out air with considerable force, and is operated best by steam-power; and that part of the pipe lying on the bottom of the tank, when the pipe is placed in it, as shown in the drawing, is perforated with many small holes, about one-eighth of an inch or less in diameter, on the sides of the pipe and at intervals, as shown at $d\ d\ d$, the end of the pipe at C being closed. Having made an ink—generally a black ink, containing salts of iron and extract of galls, with or without other ingredients, such as gum, logwood, &c.—I nearly fill this tank with it, about to the dotted line $o\ o$, and, having connected the air-pump with my perforated pipe, I drive air into the ink in many fine streams through the small holes in any desirable quantity and for any length of time. The air introduced in this manner produces violent motion, and gives to the ink the appearance of ebullition. I have found a few hours, more or less, sufficient to produce the effect obtained by aging for several weeks upon a large body of ink, depending, however, upon the nature and quantity of ink operated upon.

This apparatus is similar to one used for the mechanical agitation of hydrocarbon oils and other fluids, and I have found it very useful for agitating inks during their manufacture, and I desire to secure it for this purpose, as the agitation produced by it also causes the oxidization or aging of the ink by throwing air into it at one and the same time.

The ink, having been treated by this, my process, is allowed to settle thoroughly; or it may be filtered, and is then ready for sale and use.

I do not confine myself to the form of apparatus above described, as there are many modifications that will answer the purpose; and the air may be introduced and distributed in a variety of ways with similar effect upon the ink. And further, I do not confine myself to any particular kind of inks or writing-fluids.

I claim as my invention—

1. The process of manufacturing inks and writing-fluids by driving air through them, in the manner and for the purposes herein set forth.

2. The apparatus herein described, or any other substantially the same, for driving air into inks and writing-fluids, and for agitating them, as herein set forth.

JOHN W. CARTER.

Witnesses:
 GEO. D. NOYES,
 E. PAYSON TRACY.